(12) United States Patent
Nishimura

(10) Patent No.: US 7,963,882 B2
(45) Date of Patent: Jun. 21, 2011

(54) RANGE-SWITCHING DEVICE OF AUTOMATIC TRANSMISSION, AND CONTROL METHOD OF THE DEVICE

(75) Inventor: Naoki Nishimura, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 693 days.

(21) Appl. No.: 11/871,489

(22) Filed: Oct. 12, 2007

(65) Prior Publication Data

US 2008/0264190 A1    Oct. 30, 2008

(30) Foreign Application Priority Data

Oct. 13, 2006 (JP) ................. 2006-280026

(51) Int. Cl.
*F16H 59/60* (2006.01)
*F16H 59/62* (2006.01)
*G06F 19/00* (2006.01)
*G06F 17/00* (2006.01)
*G06F 7/00* (2006.01)

(52) U.S. Cl. ............ 477/97; 477/906; 477/907; 701/62; 701/65

(58) Field of Classification Search .............. 477/97; 701/53, 62, 65
See application file for complete search history.

(56) References Cited

U.S. PATENT DOCUMENTS

| | | | | |
|---|---|---|---|---|
| 5,919,112 | A | * | 7/1999 | Michael et al. ............... 477/99 |
| 5,964,335 | A | * | 10/1999 | Taniguchi et al. ......... 192/219.5 |
| 6,139,468 | A | * | 10/2000 | Goates et al. ................. 477/97 |
| 7,374,512 | B2 | * | 5/2008 | Ayabe et al. ................ 477/133 |
| 2006/0168833 | A1 | * | 8/2006 | Fulks et al. ............... 33/366.24 |
| 2008/0051252 | A1 | * | 2/2008 | Nishimura .................... 477/92 |

FOREIGN PATENT DOCUMENTS

| | | | |
|---|---|---|---|
| CN | 1438135 A | | 8/2003 |
| GB | 2081849 A | * | 2/1982 |
| JP | 63-297152 A | | 12/1988 |
| JP | 06-001157 A | | 1/1994 |
| JP | 2001-182827 A | | 7/2001 |
| JP | 2001-295922 A | | 10/2001 |
| JP | 2005-313753 A | | 11/2005 |

\* cited by examiner

*Primary Examiner* — Tisha D Lewis
(74) *Attorney, Agent, or Firm* — Sughrue Mion, PLLC

(57) ABSTRACT

A range-switching device of an automatic transmission has a control device that executes a fail-safe process of prohibiting the changing to the parking range if a parking load greater than or equal to a predetermined value occurs when the vehicle is at rest.

15 Claims, 14 Drawing Sheets

RANGE-SWITCHING DEVICE OF AUTOMATIC TRANSMISSION, AND CONTROL METHOD OF THE DEVICE

INCORPORATION BY REFERENCE

The disclosure of Japanese Patent Application No. 2006-280026 filed on Oct. 13, 2006, including the specification, drawings and abstract is incorporated herein by reference in its entirety.

BACKGROUND OF THE INVENTION

1. Field of Invention

The invention relates to a range-switching device that selects a transmission range in accordance with need in a vehicular automatic transmission, and to a control method of the range-switching device.

2. Description of Related Art

Generally, the selectable transmission ranges set in a vehicular automatic transmission are a parking range (P), a reverse range (R), a neutral range (N), a drive range (D), etc.

As for a method of selecting one from these transmission ranges and the like, a transmission range is selected by a driver operating a shift lever that is disposed near the driver's seat of the vehicle.

In the drive range D, the speed change ratio is automatically switched to an optimal speed change step (preset ratio) in accordance with the situation of the driving of the vehicle.

An example of the range-switching device for selecting a transmission range is a device having a detent lever that is pivotably supported and that is rotationally driven in an appropriate direction so as to change the state of a manual valve that is a component element of a transmission range-switching hydraulic control device provided in the automatic transmission, and a shift cable for drivingly interconnecting the detent lever and a shift lever.

That is, in such a range-switching device, as the shift lever is operated by a driver of the vehicle, the state of the manual valve is appropriately changed via the shift cable and the detent lever so as to switch the transmission range to the range selected by the driver operating the shift lever.

However, in the system employing the shift cable, there are inconveniences and the like, for example, considerable restrictions in the layout of the shift cable, and the like. Therefore, for example, Japanese Patent Application Publication No. 2001-182827 (JP-A-2001-182827) discloses a system called shift-by-wire.

This technology has a construction in which the shift lever and the detent lever are not interconnected by a shift cable but are mechanically separated, and in which when a driver operates the shift lever, the thus-selected transmission range is detected by a sensor or the like, and the state of the manual valve is appropriately changed by driving the detent lever via an actuator, such as a motor or the like, so as to switch the transmission range to the detected range.

Furthermore, as shown in Japanese Patent Application Publication No. 2001-295922 (JP-A-2001-295922), a related-art range-switching device is provided with a parking lock device for putting an output shaft of the automatic transmission into a locked state in which the output shaft is unrotatable, when the transmission range is switched to the parking range P.

The parking lock device is able to put the output shaft into the locked state in which the output shaft is unrotatable by engaging the claw of a parking lock pawl with a parking gear that is fixed to an outside of the output shaft, and to put the output shaft into an unlocked state in which the output shaft is rotatable by drawing the hook apart from the parking gear.

In the aforementioned art related to the invention, if during a rest of the vehicle, the parking range P is selected through the operation of the shift lever, the transmission range is switched to the parking range P even in the case where the posture of the vehicle is inclined forward or rearward.

However, in the case where the vehicle is inclined, the output shaft of the automatic transmission receives a torque that acts to turn the output shaft (parking load) from the wheels of the vehicle, so that the claw of the parking lock pawl tends to strongly engage with the parking gear.

Therefore, the larger the inclination angle of the vehicle, the larger the torque becomes, and the stronger the engagement of the claw of the parking lock pawl into the parking gear becomes.

In such a situation, if the changing from the parking range P to another transmission range is to be performed, a large force is needed in order to draw the claw of the parking lock pawl from the parking gear since the claw is strongly engaged into the parking gear as mentioned above.

Against this inconvenience, the aforementioned related art is constructed so as to change the transmission range from the parking range P to another range in the above-described situation by forcibly drawing the claw of the parking lock pawl from the parking gear through a power assist operation via a motor or the like.

If the construction in which the parking engagement is forcibly released is adopted, an excessive load can be applied to the parking gear or the claw of the parking lock pawl, and therefore, there can arise a problem of increased deformation of the parking gear or the claw of the parking lock pawl.

Furthermore, in the case where a vehicle tows a trailer, such as a camping trailer or the like, the above-described situation results in a further increased parking load than in the case where a vehicle is used alone without a trailer. Therefore, a vehicle towing a trailer can experience an instance where the changing from the parking range P to another transmission range is very difficult.

Therefore, if a vehicle towing a trailer should fall into the above-described situation, great amounts of labor and cost can be needed, that is, large-scale measures can need to be taken; for example, the trailer needs to be separated from the vehicle, or the vehicle needs to be lifted and forcibly moved from the road by a wrecker or the like, etc.

SUMMARY OF THE INVENTION

It is an object of the invention to prevent the switching to the parking range in a range-switching device that selects one of transmission ranges in an automatic transmission for a vehicle in accordance with need, in a situation where the parking load becomes excessively large when the vehicle is at rest, so as to avoid occurrence of an inconvenience in which the changing from the parking range to another transmission range is difficult as in the art related to the invention.

A first aspect of the invention relates to a range-switching device of an automatic transmission. This range-switching device of an automatic transmission selects a transmission range in an automatic transmission for a vehicle in accordance with need. The range-switching device includes a control device that executes a fail-safe process of prohibiting the changing to a parking range if there is a parking load greater than or equal to a predetermined value when the vehicle is at rest.

Incidentally, the parking load is a torque that acts on an output shaft of the automatic transmission due to parameters such as the inclined posture of the vehicle during a rest of the vehicle, the dead weight of the vehicle, the load, a trailer, etc. Besides, the force that is needed if the transmission range is to be changed from the parking range to another transmission range after being switched to the parking range while the vehicle is at rest will be hereinafter referred to as "parking release load".

If the posture of the vehicle is horizontal as in the case where the vehicle is at rest on a flat road, the parking load is considered to be substantially zero, and therefore the parking release load becomes minimum. On the other hand, if the posture of the vehicle is greatly inclined as in the case where the vehicle is at rest on a slope road, such as an uphill road, a downhill road, etc., the parking load and the parking release load are both large. Naturally, during the inclined posture of the vehicle, the greater the weight on the drive wheels, the greater the parking load and the parking release load.

Therefore, in the range-switching device of the automatic transmission in accordance with the first aspect of the invention, if during a rest of the vehicle, the parking load and the parking release load are both great due to, for example, great inclination of the posture of the vehicle, the changing to the parking range is prohibited.

That is, when the range is changed to the parking range at the time of rest of the vehicle, it is assumed that the range is switched to the parking range, and on that assumption, it is estimated whether or not the present situation is a situation in which the changing from the parking range to another range would be impossible. If the present situation is a situation in which the changing from the parking range would be impossible, the changing to the parking range is prohibited. If the present situation is a situation in which the changing from the parking range would be possible, the changing to the parking range is permitted.

Thus, in the case where the changing to the parking range is prohibited, the driver can be informed that the present stop state of the vehicle is a situation that is not suitable for parking, and that it is advisable to move the vehicle from the present stop place to another place.

Therefore, unlike the aforementioned art related to the invention, the embodiment can avoid falling into a situation where the release from the parking range becomes difficult after the range has been switched to the parking range. Therefore, it becomes possible to prevent, for example, excessively large parking load acting on the parking lock mechanism. Hence, it becomes possible to restrain deformation of the parking lock mechanism. Furthermore, since it is no longer necessary to forcibly change the range from the parking range to another range by performing power assist through the use of a motor or the like as in the art related to the invention, the provision of extra equipment or the like will be avoided.

The parking load may be a torque that acts on an output shaft of the automatic transmission due to parameters such as the inclined posture of the vehicle during a stopped state, the dead weight of the vehicle, etc.

In this construction, the parking load is specified, and it becomes clear that the parking load acts on the output shaft.

The range-switching device may further include: a range selection portion for selecting a transmission range; a driving device that switches the transmission range to a range selected by the range selection portion; and a parking lock device that causes the output shaft of the automatic transmission to be in an unrotatable state when the parking range is selected, and the control device may execute a shift process of controlling the driving device or the parking lock device so as to switch the transmission range to a range selected by the range selection portion or to an appropriate range in accordance with a state of run of the vehicle.

The construction clarifies the construction of the range-switching device and the construction that realizes the fail-safe process.

In order to execute the fail-safe process, the control device may include: a load estimation portion that estimates the parking load when the vehicle is at rest; a determination portion that determines whether or not the changing to the parking range is allowable by comparing a result of estimation by the load estimation portion with a predetermined threshold value; and a coping portion that prohibits the changing to the parking range if the determination portion determines that the changing to the parking range is not allowable.

This condition clarifies a construction for executing the fail-safe process in the control device.

In order to change a state of a manual valve that is a component element of a transmission range-switching hydraulic control device provided in the automatic transmission, the driving device may have: a detent lever that is pivotably supported and that is rotationally driven in an appropriate direction; and an actuator for rotationally driving the detent lever in the appropriate direction. The range-switching device may further have: a detection portion that detects a position of the transmission range selected by the range selection portion; and a lock portion for physically immobilizing the detent lever in accordance with need. The control device may execute: a shift process of switching the transmission range to the selected transmission range by electrically controlling the actuator based on a detection result provided by the detection portion; and a fail-safe process of prohibiting the changing to the parking range by immovably locking the detent lever via the lock portion if the parking load is greater than or equal to the predetermined value when the vehicle is at rest.

In this construction, a content of the fail-safe process is realized by a mechanical form in which the detent lever is immovably locked. Therefore, it becomes possible to reliably avoid predictable occurrence of inconvenience and the like.

The driving device may further have: a detent lever that is pivotably supported and is rotationally driven in an appropriate direction and thus changes the state of a manual valve that is a component element of a transmission range-switching hydraulic control device provided in the automatic transmission; and an actuator for rotationally driving the detent lever in the appropriate direction. The range-switching device may further include a detection portion that detects a position of the transmission range selected by the range selection portion, and the control device may execute: a shift process of switching the transmission range to the selected transmission range by electrically controlling the actuator based on a detection result provided by the detection portion; and a fail-safe process of prohibiting the changing to the parking range by prohibiting driving of the actuator even if the parking range has been selected by the range selection portion in a case where the parking load is greater than or equal to the predetermined value when the vehicle is at rest.

In this construction, the actions by the fail-safe process are implemented through electronic control. This makes the range-switching device advantageous in curbing the rise in the equipment cost; for example, the need for adding an extra piece of equipment is eliminated, or the like.

The driving device may have a detent lever that is pivotably supported and that is rotationally driven in an appropriate direction and thus changes the state of a manual valve that is a component element of a transmission range-switching hydraulic control device provided in the automatic transmission. The range-switching device may further have: a shift cable that mechanically drivingly interconnects the detent lever and the range selection portion; and a lock portion for physically immobilizing the detent lever in accordance with need. The control device may immovably lock the detent lever via the lock portion when the fail-safe process is executed.

In this construction, as an action by the fail-safe process, the operation of shifting to the parking range is prohibited by immovably constraining the detent lever. Furthermore, merely the lock mechanism is employed. Therefore, the construction is advantageous in the simplification of equipment and the reduction of equipment cost, in comparison with the case where power assist means, such as a motor or the like, is employed as in an art related to the invention.

The range-switching device may further include an information device that informs a driver of the vehicle that the changing to the parking range is prohibited, when the fail-safe process has been executed. This information device may be a buzzer that produces an alarm sound, or a display panel that displays an alarm.

According to this construction, the driver is informed that the changing to the parking range has been prohibited. Therefore, the driver can recognize that it is not an abnormality occurring in the vehicle. Due to this recognition, the driver can recognize that the present state of stop of the vehicle is a situation that is not suitable for parking. Thus, the foregoing information can serve for the driver as a clear advice that the vehicle should be moved to another place from the present place of stop.

A second aspect of the invention relates a control method of a range-switching device of an automatic transmission for a vehicle that selects a transmission range in the automatic transmission in accordance with need. This control method of the range-switching device of the automatic transmission includes the step of executing a fail-safe process of prohibiting the changing of the transmission range to a parking range if there is a parking load greater than or equal to a predetermined value when the vehicle is at rest.

According to the invention, in a situation where the parking load becomes excessively large when the vehicle is at rest, for example, in a situation where the vehicle is at rest in a greatly inclined posture on a slope road or the like, the changing of the range to the parking range is avoided, so as to prevent occurrence of the inconvenience that the changing from the parking range to another transmission range becomes impossible as in the art related to the invention.

Therefore, it becomes possible to, for example, reduce the deformation of a parking gear, a parking lock pawl, etc., as component elements of the parking lock device. Besides, the range-switching device of the invention is advantageous in reducing the equipment cost; for example, the need for a power assist device, such as a motor or the like, as described in conjunction with the art related to the invention, is eliminated, and the like.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Embodiments of the invention will be described hereinafter with reference to the drawings. FIGS. 1 to 14 show an embodiment of the invention.

Figure 1:
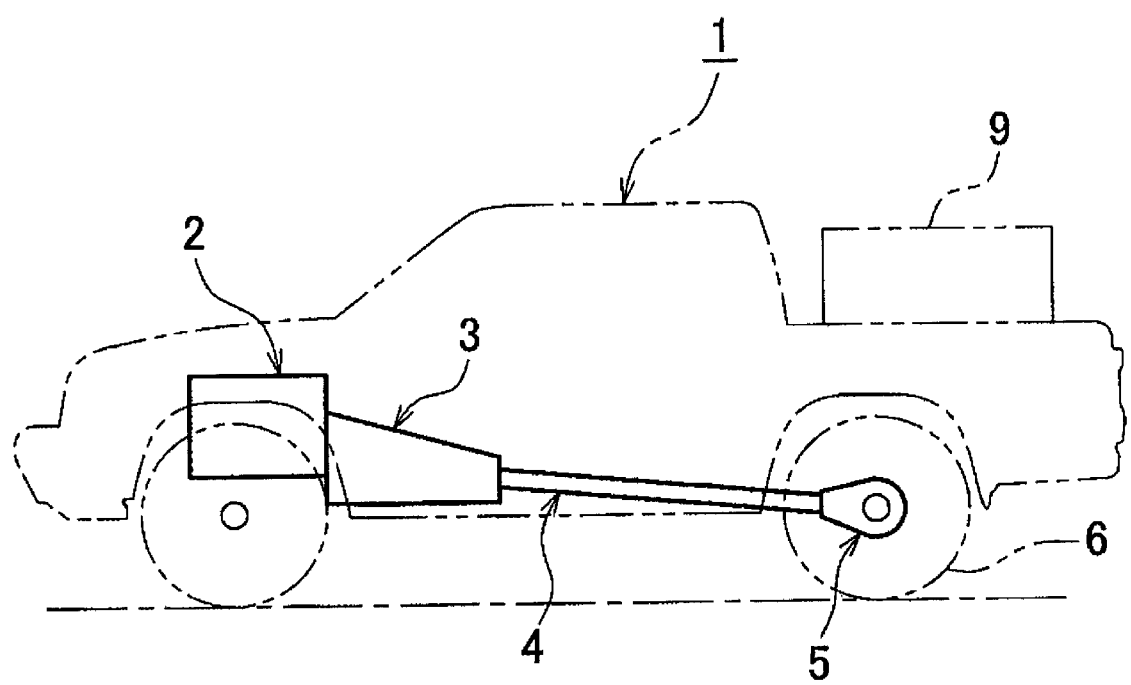
FIG. 1 is a schematic side view showing an example of a vehicle to which the invention is applicable.
Figure 2:
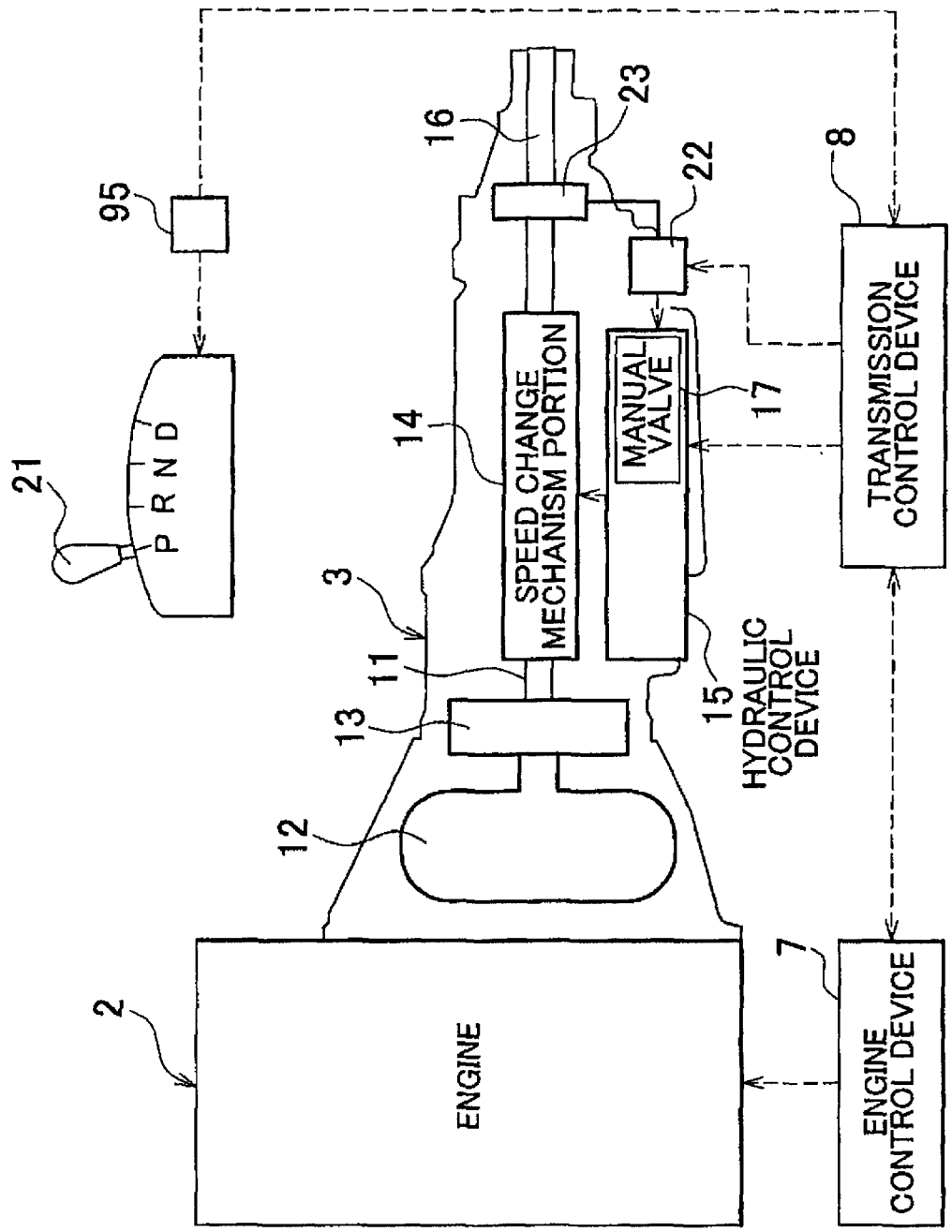
FIG. 2 is a schematic diagram showing a power train of the vehicle shown in FIG. 1.

Firstly, with reference to FIGS. 1 and 2, an example of a vehicle to which the invention is applicable will be roughly described. FIG. 1 is a schematic side view showing an example of a vehicle to which the invention is applicable. FIG. 2 is a schematic diagram showing a power train of the vehicle shown in FIG. 1.

In these drawings, a vehicle 1 is a front-engine rear-drive (FR) type vehicle. In this vehicle 1, rotational power generated by an engine 2 is appropriately converted by an automatic transmission 3, and is transmitted to left and right rear wheels 6 via a propeller shaft 4 and a differential 5.

The engine 2 and the automatic transmission 3 make up a power train. The engine 2 and the automatic transmission 3 are controlled by an engine control device 7 and a transmission control device 8, respectively. The engine control device 7 and the transmission control device 8 are interconnected so as to be able to send information to and receive information from each other in accordance with need. Besides, the vehicle 1 is loaded with a load 9.

The automatic transmission 3, as shown in FIG. 2, mainly includes an input shaft 11, a torque converter 12, an oil pump 13, a speed change mechanism portion 14, a hydraulic control device 15, an output shaft 16, etc.

As for actions of the automatic transmission 3, as the rotation of a crankshaft (not shown) of the engine 2 is input to the input shaft 11 via the torque converter 12, the rotation input to the input shaft 11 is changed in speed to an appropriate speed change ratio by the speed change mechanism portion 14, and then is output from the output shaft 16.

Although not shown in detail in the drawings, the speed change mechanism portion 14 is, for example, a construction employing a plurality of stages of planetary gear mechanisms, and may also be a construction employing a continuously variable speed change mechanism represented by, for example, a CVT, or the like.

The hydraulic control device 15 is a device for controlling the speed shift actions of the foregoing speed change mechanism portion 14. Although not shown in detail, the hydraulic control device 15 at least includes a plurality of linear solenoid valves that control the engaging actions of various brakes and clutches that are used by the speed change mechanism portion 14, and a manual valve 17 that supplies operating fluid to the linear solenoid valves in accordance with need.

The manual valve 17 supplies the operating fluid from appropriate ports to appropriate linear solenoid valves in order to switch the range among the neutral range N, the drive range D and the reverse range R corresponding to the operation performed on a shift lever 21 by the driver.

The manual valve 17 is made up of a spool valve. The manual valve 17 has a valve body 17a with various oil supply ports and discharge ports (not shown), and a spool 17b housed in the valve body 17a so as to be displaceable in the directions of an axis.

The manual valve 17 is constructed so that if the manual valve 17 is positioned at a predetermined position by displacing the spool 17b in one or the other of the directions of the axis, the range is appropriately switched among the parking range P, the reverse range R, the neutral range N and the drive range D. For example, the valve body 17a is formed as an integral portion of a case of the automatic transmission 3.

The engine control device 7 and the transmission control device 8 each employ an ECU (Electronic Control Unit), and have similar hardware constructions. The following description will be made in conjunction with only the transmission control device 8 related to the invention, without further reference to the engine control device 7.

Figure 4:
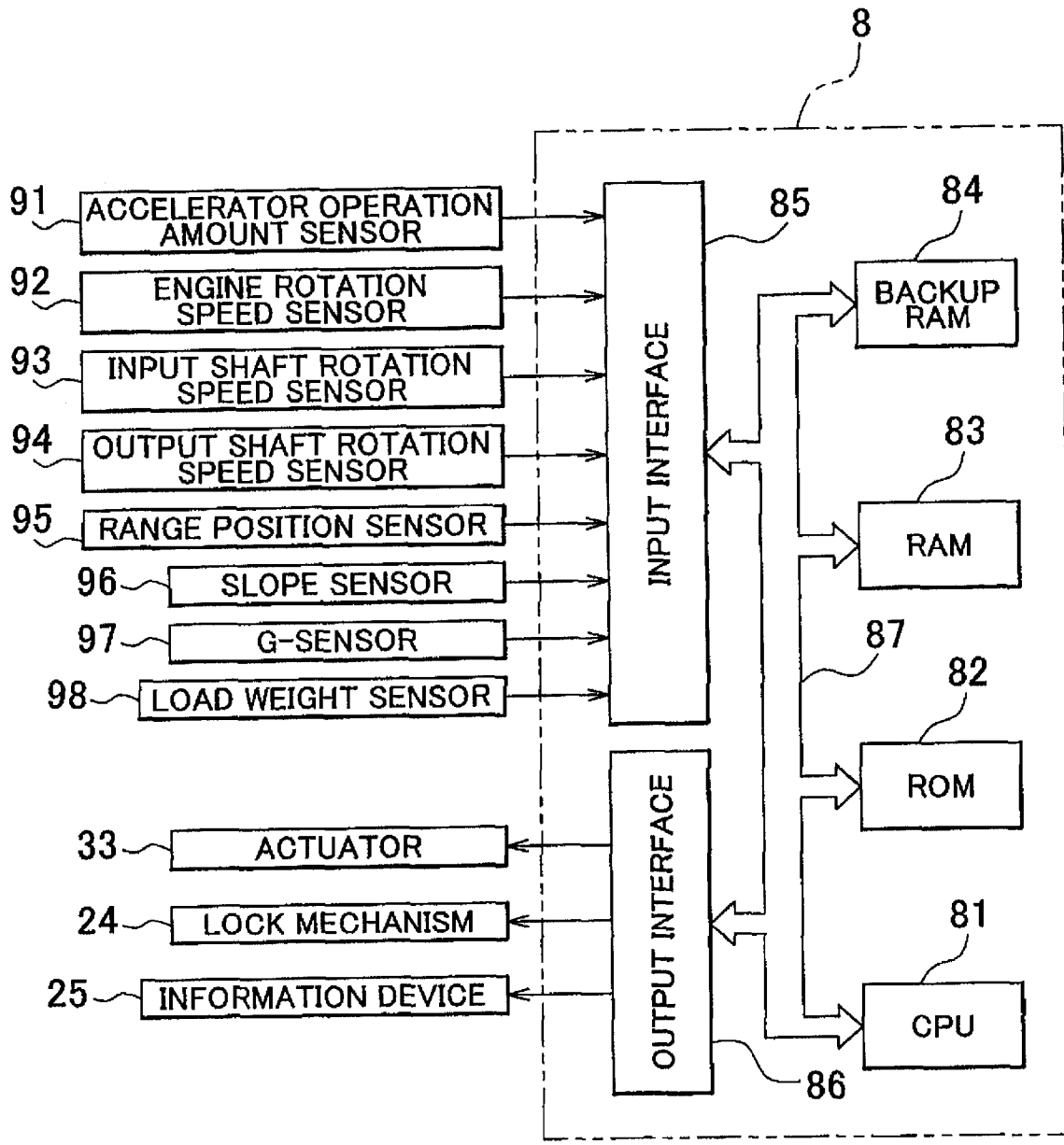
FIG. 4 is a construction block diagram showing a transmission control device shown in FIG. 3.

The transmission control device 8 establishes an appropriate speed change step in the speed change mechanism portion 14, that is, an appropriate power transmission path, by controlling the hydraulic control device 15. As shown in FIG. 4, the transmission control device 8 is made up of a central processing unit (CPU) 81, a read-only memory (ROM) 82, a random access memory (RAM) 83, a backup RAM 84, an input interface 85, and an output interface 86 that are interconnected by a bidirectional bus 87.

The CPU 81 executes computation processes on the basis of various control programs and control maps stored in the ROM 82. The ROM 82 stores various control programs for controlling speed shift processes of the speed change mechanism portion 14, or a fail-safe process to which a feature of the invention is applied. The fail-safe process will be described in detail later. The RAM 83 is a memory for temporarily storing results of the computations by the CPU 81, data input from various sensors, etc. The backup RAM 84 is a non-volatile memory that stores data of various kinds that needs to be retained.

Various sensors are connected to the input interface 85, at least including an accelerator operation amount sensor 91, an engine rotation speed sensor 92, an input shaft rotation speed sensor 93, an output shaft rotation speed sensor 94, a range position sensor 95, a slope sensor 96, a G-sensor 97, a load weight sensor 98, etc. Various devices and the like are connected to the output interface 86, at least including an actuator 33, a lock mechanism 24, an information device 25 of a range-switching device 20, etc.

The accelerator operation amount sensor 91 detects the amount of depression of an accelerator pedal (not shown) or the like. The engine rotation speed sensor 92 detects the rotation speed NE of the engine 2 transmitted to the torque converter 12. The input shaft rotation speed sensor 93 detects the rotation speed NT of the input shaft 11. The output shaft rotation speed sensor 94 defects the rotation speed Nout of the output shaft 16. The range position sensor 95 detects at which one of the parking range (P), the reverse range (R), the neutral range (N), the drive range (D), etc. the shift lever 21 is positioned.

The foregoing slope sensor 96 detects the inclination angle of the vehicle 1. The G-sensor 97 is used, for example, by an ABS system, that is, the output of the G-sensor 97 is utilized by the system. The load weight sensor 98 detects the weight of the load 9 placed on the vehicle 1.

The vehicle 1 constructed as described above is equipped with the range-switching device 20 for switching the transmission range to a desired speed change state or range (the parking range P, the reverse range R, the neutral range N, the drive range D, etc.) of the automatic transmission 3 in accordance with a request from the driver.

Figure 3:
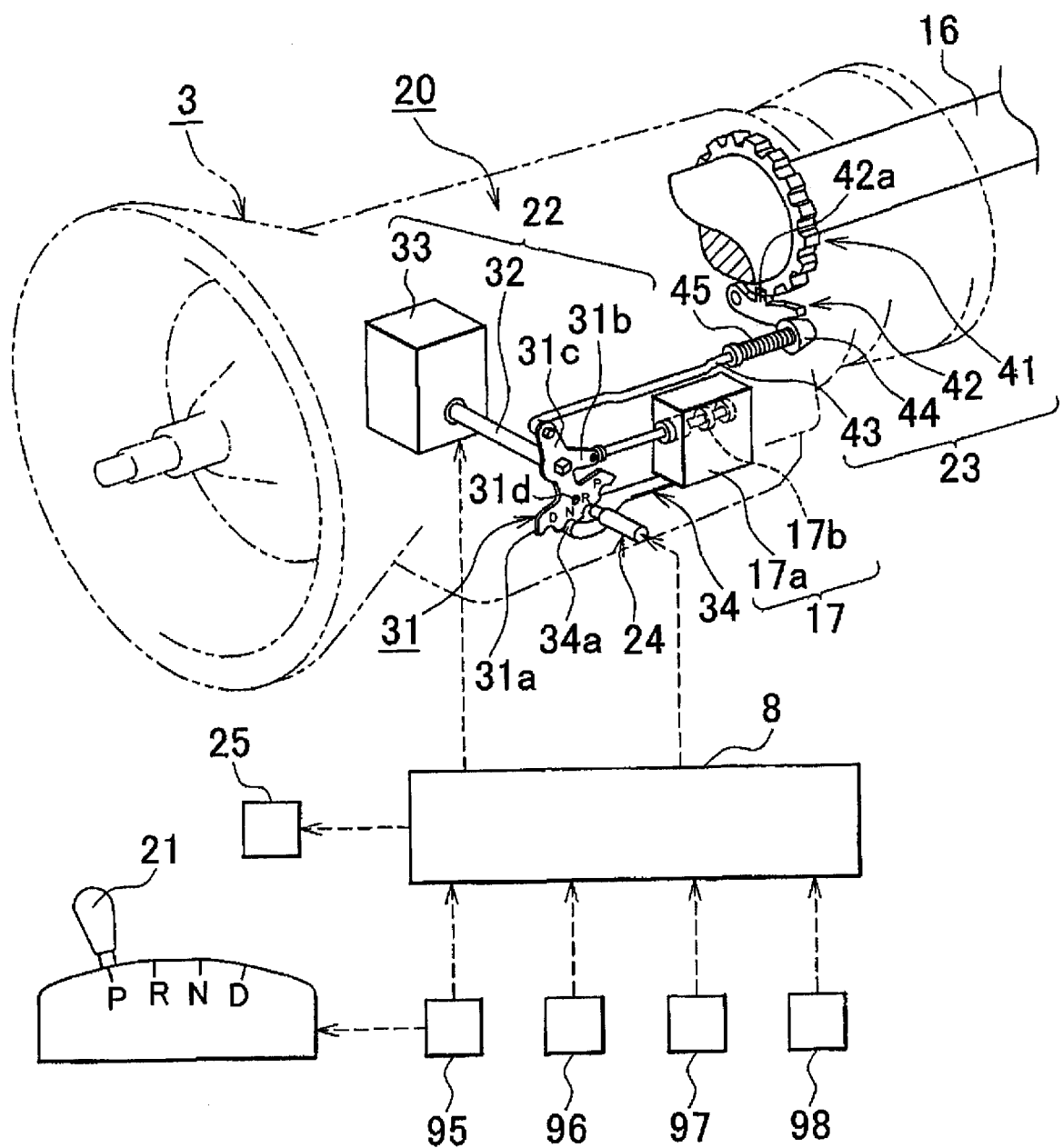
FIG. 3 is a perspective view of an overall construction of an embodiment of a range-switching device of an automatic transmission in accordance with the invention.

The range-switching device 20, as shown in FIG. 3, mainly includes the shift lever 21, a drive unit 22, a parking lock mechanism 23, the lock mechanism 24, and the information device 25.

The shift lever 21 is disposed near a driver's seat of the vehicle 1, and is manually operated to be positioned into an arbitrary transmission range.

The drive unit 22 changes the state of the manual valve 17, which is a component element of the hydraulic control device 15 provided for the switching between the transmission ranges, in order to switch the range to a transmission range selected with the shift lever 21. The drive unit 22 is controlled by the transmission control device 8. Besides, the transmission control device 8 is also able to perform a process of switching the transmission range to an appropriate transmission range in accordance with the state of run of the vehicle 1. That is, in this embodiment, the transmission control device 8 can be regarded as a control device in the invention. This function may also be realized by a control device provided separately from the transmission control device 8.

The drive unit 22, as shown in FIG. 3, mainly includes a detent lever 31, a range select control shaft 32, the actuator 33, and a latch lever 34.

The detent lever 31 is pivoted or tilted, for example, in a manner of four steps, in coordination with the transmission range (e.g., the parking range P, the reverse range R, the neutral range N, or the drive range D) selected by the shift lever 21. In accordance with the tilted posture of the detent lever 31, the spool 17b of the manual valve 17 is displaced in the direction of the axis.

The detent lever 31 is coupled integrally to an end of the range select control shaft 32, and is pivoted integrally with the range select control shaft 32.

Figure 6:
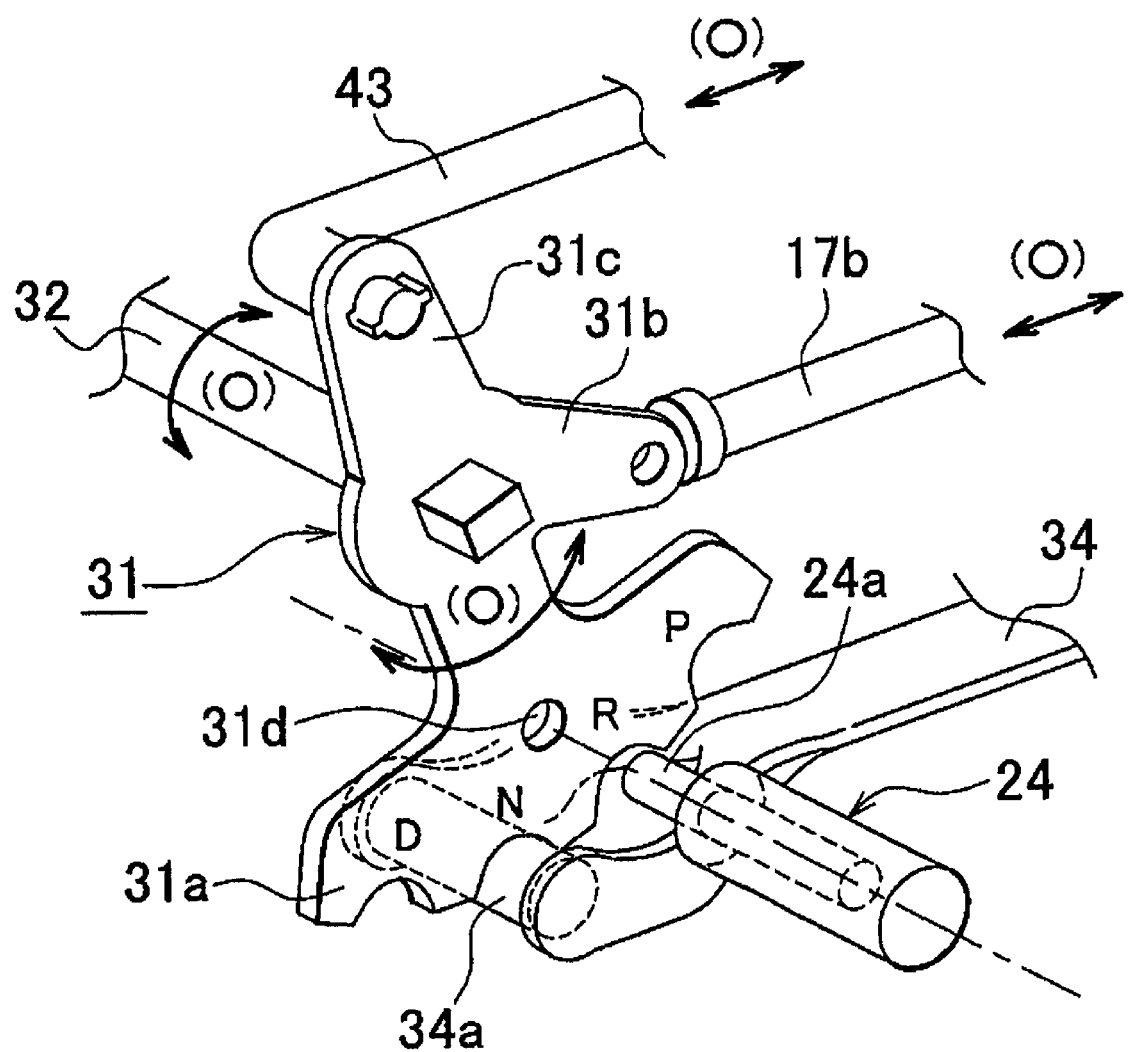
FIG. 6 is a perspective view showing an unlocked state of a lock mechanism in the range-switching device shown in FIG. 3.
Figure 7:
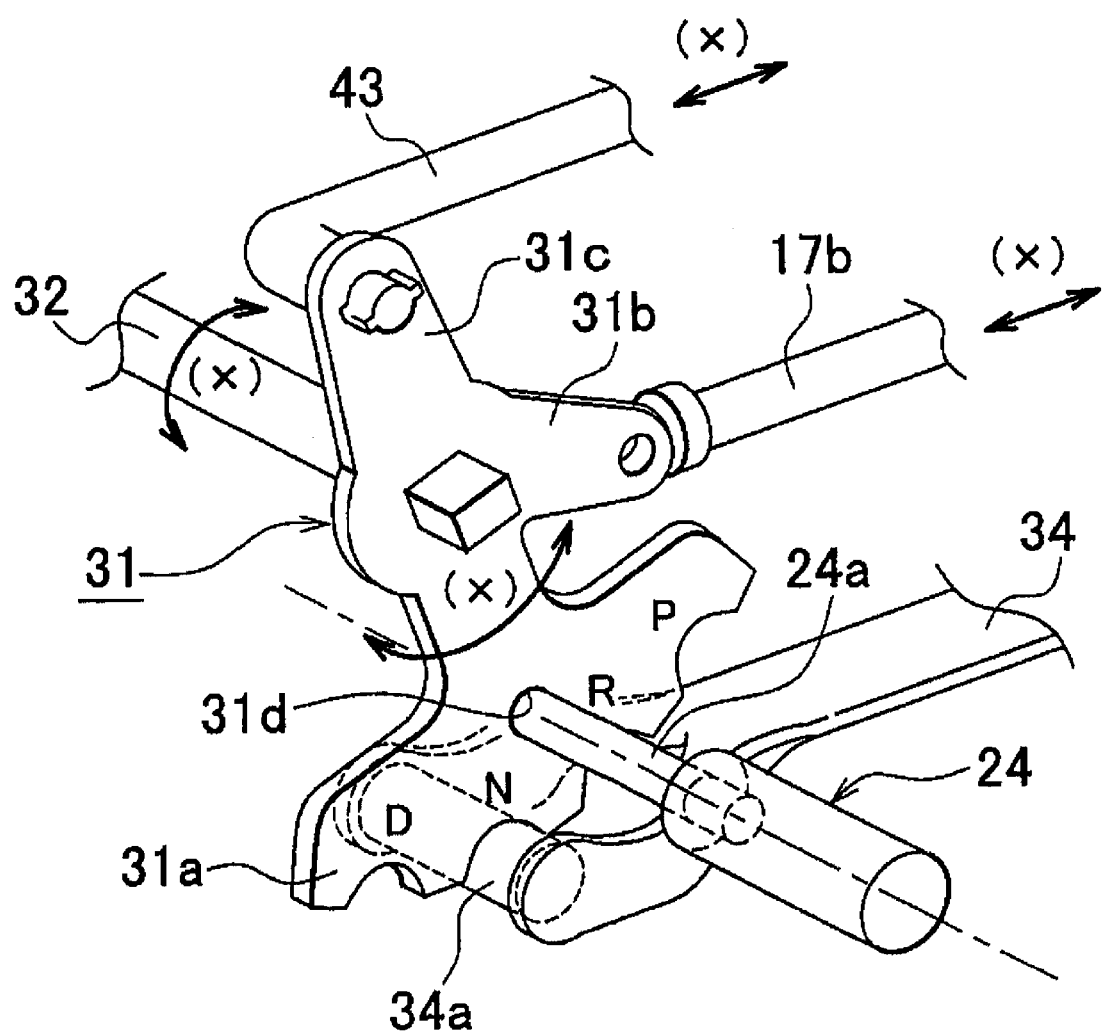
FIG. 7 is a perspective view showing a locked state of the lock mechanism of the range-switching device shown in FIG. 3.

A fan-shape arm 31a of the detent lever 31 is provided with a wave-shape groove. The wave-shape groove has groove recesses whose number (four) corresponds to the number of the range positions (the parking range P, the reverse range R, the neutral range N and the drive range D) of the shift lever 21. As shown in FIGS. 3, 6 and 7, the four groove recesses are marked with P, R, N and D provided near the groove recesses.

An arm 31b of a bifurcated portion of the detent lever 31 is coupled to a front end of the spool 17b of the manual valve 17, and the other arm 31c of the bifurcated portion is coupled to a front end of a parking lock rod 43 of the parking lock mechanism 23.

If the detent lever 31 is appropriately tilted, the spool 17b is moved either one of the directions of the axis, so that the range is switched among the parking range P, the reverse range R, the neutral range N and the drive range D.

The range select control shaft 32 is supported pivotably on the case or the like of the automatic transmission 3, and is rotationally driven in appropriate direction by the actuator 33.

The actuator 33 tilts the detent lever 31 in an appropriate direction by rotationally driving the range select control shaft 32 in an appropriate direction. Although not shown in detail, the actuator 33 includes, for example, an appropriate motor, and a speed reducing mechanism (a worm gear or the like).

The latch lever 34 is provided for retaining each of the four stepped tilt positions of the detent lever 31. The latch lever 34 includes a main body made up of a leaf spring or the like an end of which is attached to the valve body 17a of the manual valve 17. An another end of the latch lever 34 is provided with a pin 34a that is engageable with any one of the groove recesses of the fan-shape arm 31a of the detent lever 31.

The parking lock mechanism 23 brings about a state in which the output shaft 16 of the automatic transmission 3 cannot be rotated, when the parking range P is selected. The parking lock mechanism 23 mainly includes a parking gear 41, a parking lock pawl 42, and the parking lock rod 43.

The parking gear 41 is fixed to an outside of the output shaft 16. The parking lock pawl 42 is supported so as to be easily tiltable in the directions to and away from the parking gear 41. The parking lock pawl 42 is provided with a claw 42a that is engageable into and disengageable from spaces between teeth of the parking gear 41.

An end of the parking lock rod 43 is connected to the detent lever 31 so that the pivot motion of the detent lever 31 displaces the parking lock rod 43 toward the front end or the rear end thereof substantially parallel to the output shaft 16.

Another end of the parking lock rod 43 is provided with a taper cone 44 for tilting the parking lock pawl 42. The taper cone 44 is urged by a coil spring 45 so as to be pushed against the parking lock pawl 42.

Figure 9:
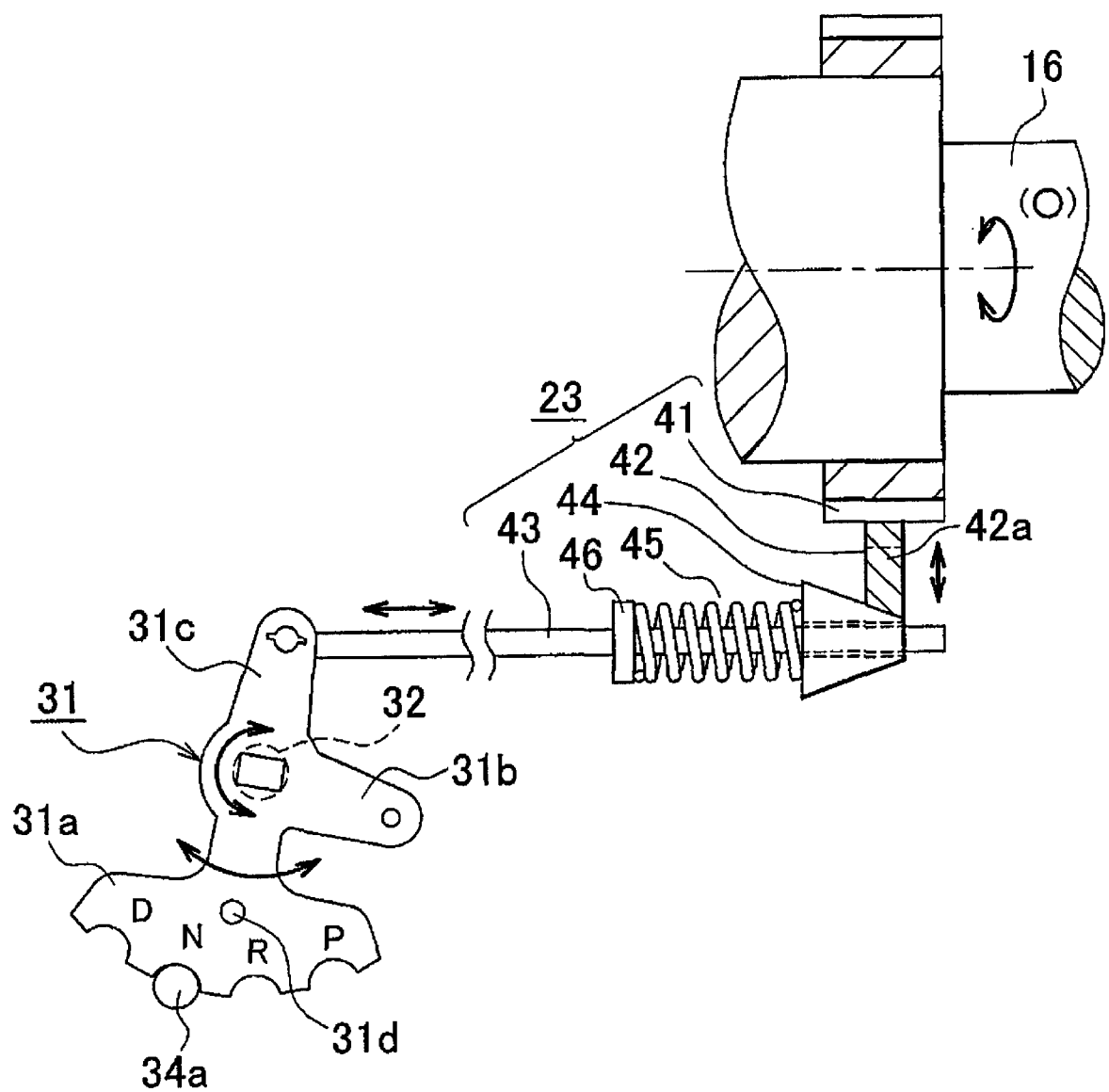
FIG. 9 is a side view of the parking lock mechanism shown in FIG. 8.

A snap ring 46, as shown in FIG. 9, is stationarily engaged with the parking lock rod 43 to bear an end of the coil spring 45.

The actions of the parking lock mechanism 23 will be described.

Figure 10:
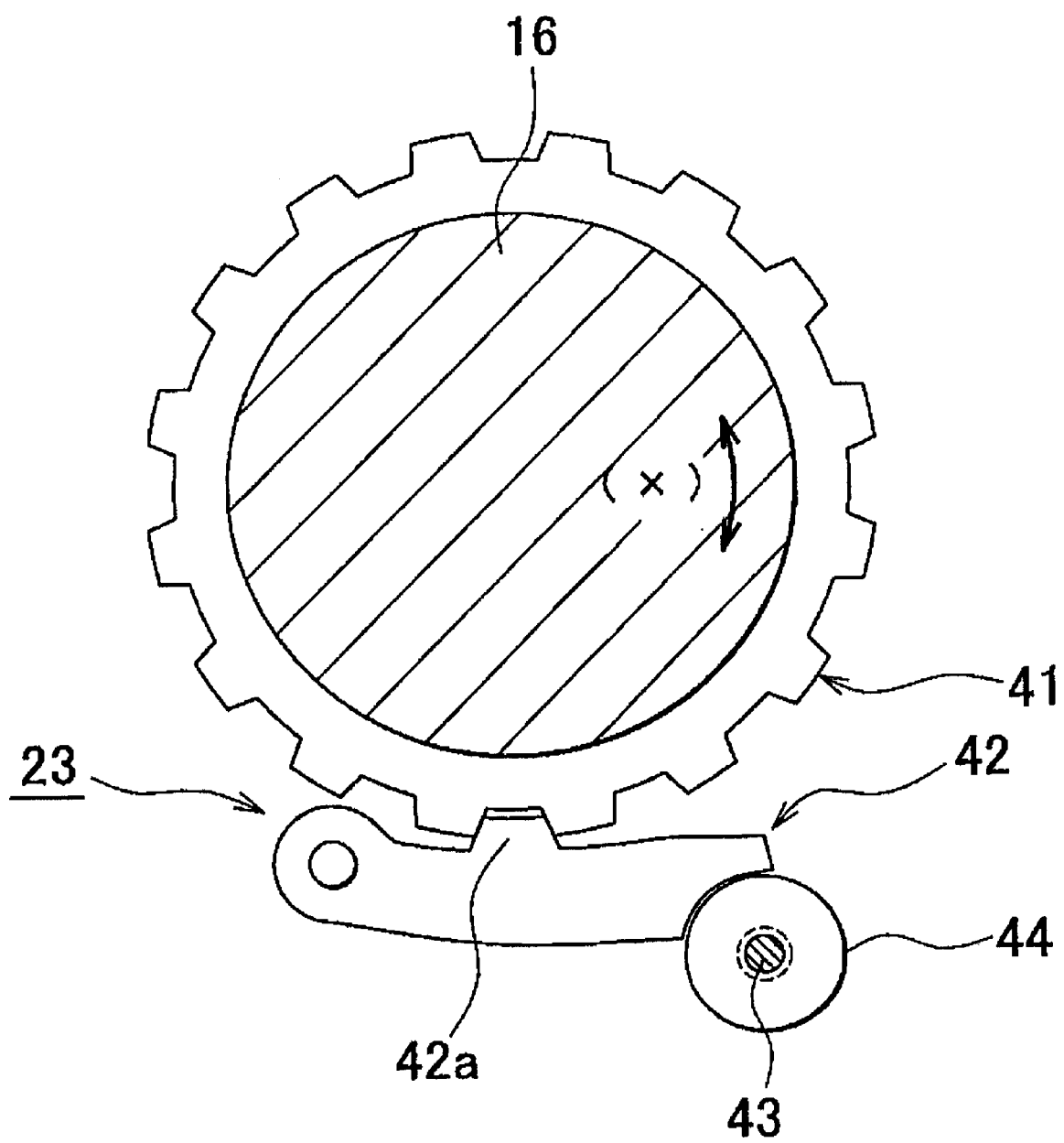
FIG. 10 is a front view showing a locked state of the parking lock mechanism shown in FIG. 3.
Figure 11:
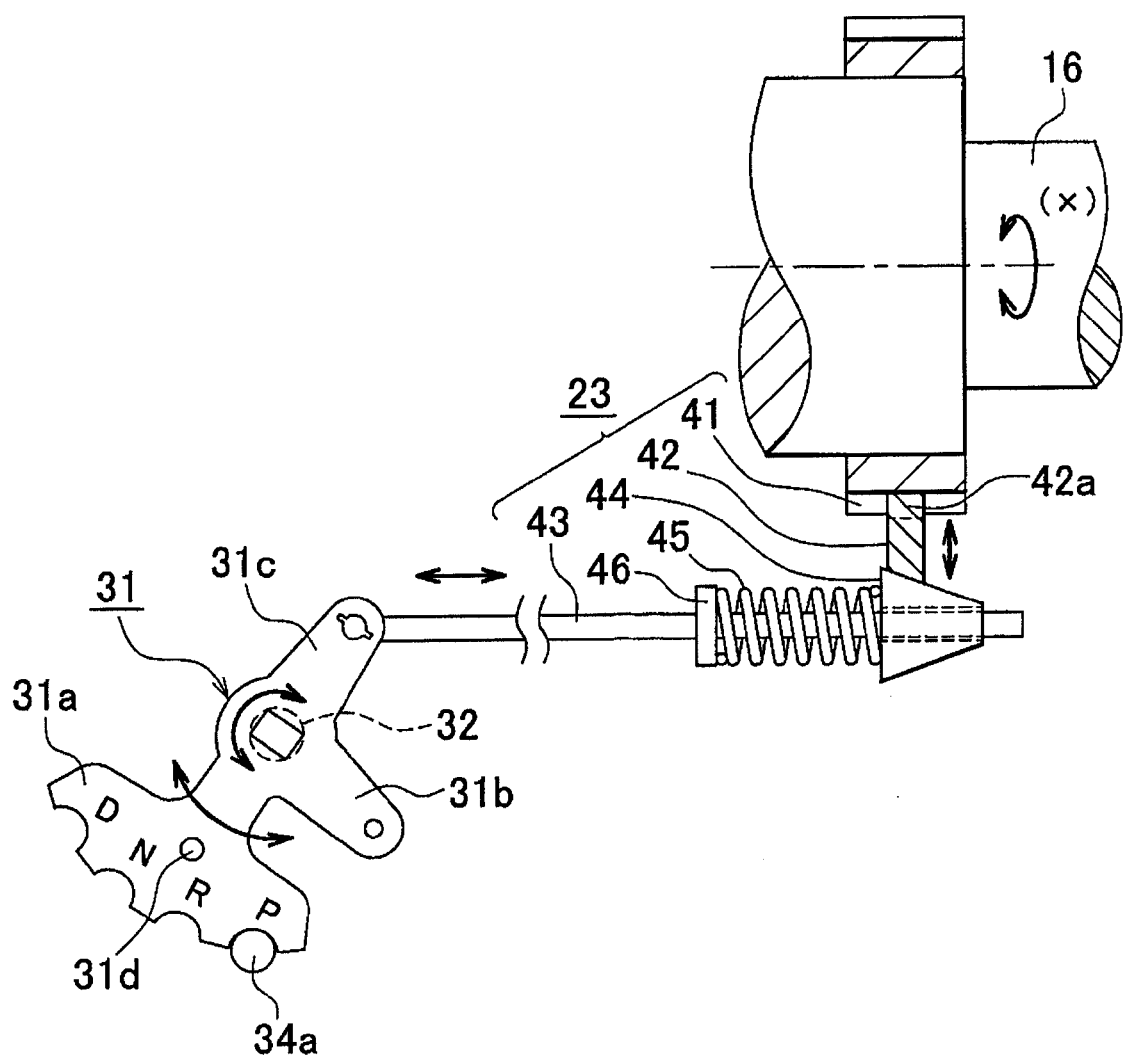
FIG. 11 is a side view of the parking lock mechanism shown in FIG. 10.

Firstly, if, as shown in FIGS. 10 and 11, the detent lever 31 is pivoted to slide the parking lock rod 43 toward, for example, a rear end of the vehicle, the taper cone 44 pushes the parking lock pawl 42 upward so that the claw 42a of the parking lock pawl 42 engages into a space between teeth of the parking gear 41. Thus, the output shaft 16 is put into a locked state in which the output shaft 16 cannot be rotated. Incidentally, in FIGS. 10 and 11, an arrowed line marked with (x) means an immovable state.

Figure 8:
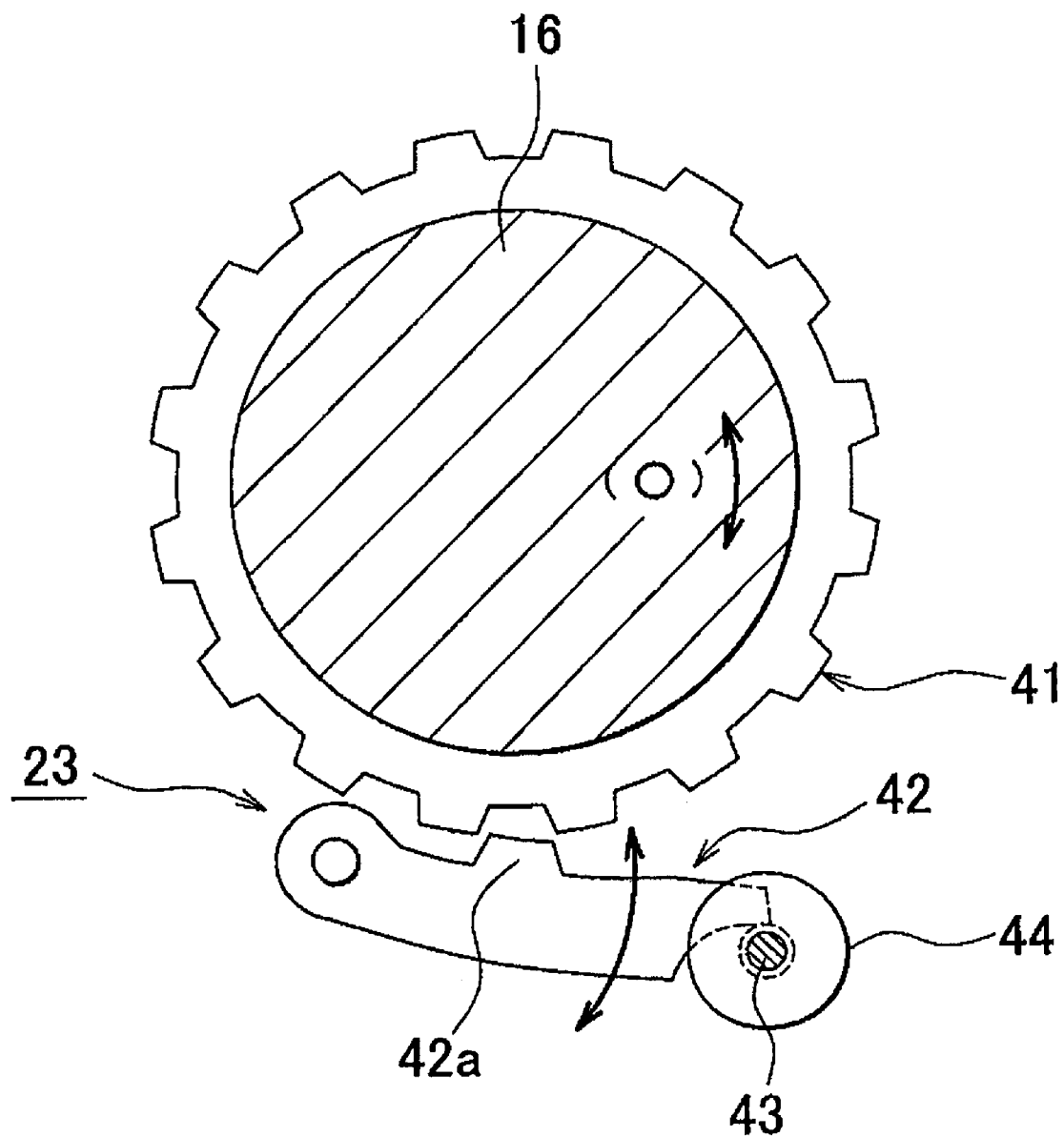
FIG. 8 is a front view showing an unlocked state of a parking lock mechanism shown in FIG. 3.

On the other hand, if, as shown in FIGS. 8 and 9, the detent lever 31 is pivoted to slide the parking lock rod 43 toward, for example, a front end of the vehicle, the push-up force of the taper cone 44 on the parking lock pawl 42 is removed and the parking lock pawl 42 moves downward so that the claw 42a falls out of the space between teeth of the parking gear 41. Thus, the output shaft 16 is put into an unlocked state in which the output shaft 16 is rotatable. Incidentally, in FIGS. 8 and 9, an arrowed line marked with (o) means a movable state.

When the vehicle 1 equipped with the above-described parking lock mechanism 23 is stopped, for example, on an inclined road, such as an uphill road, a downhill road, etc., with the transmission range locked at the parking range P, a force from the rear wheels 6 acts to turn the parking gear 41, but an urging force in such a direction as to prevent the turning of the parking gear 41 causes the claw 42a of the parking lock pawl 42 to hook on the parking gear 41. Therefore, in order to release the claw 42a of the parking lock pawl 42 from the state of the parking range P, a large parking release load is needed.

The lock mechanism 24 is provided for physically immobilizing the detent lever 31 in accordance with need, and employs a solenoid plunger in this embodiment.

Actions of the lock mechanism 24 will be described. Firstly, as shown in FIG. 7, the lock mechanism 24 made up of the solenoid plunger is caused to protrude a plunger 24a so that the plunger 24a engages into a lock hole 31d of the detent lever 31, thus bringing about a locked state in which the detent lever 31 is immovable. As shown in FIG. 6, as the plunger 24a of the lock mechanism 24 is withdrawn from the lock hole 31d of the detent lever 31 into a cylinder of the lock mechanism 24, an unlocked state in which the detent lever 31 is tiltable is brought about.

Next, actions of the range-switching device 20 constructed as described above will be described with reference to FIGS. 4 and 5.

Simply speaking, the range-switching device 20 is devised so that if a parking load greater than or equal to a predetermined value occurs when the vehicle 1 is stopped, a fail-safe process of prohibiting the changing to the parking range P is executed.

The parking load is a torque T that acts on the output shaft 16 of the automatic transmission 3 due to parameters such as the inclined posture of the vehicle 1 during a rest, the dead weight of the vehicle, the load 9, etc. Besides, the force that is needed if the transmission range is to be switched from the parking range P to another transmission range after being switched to the parking range P while the vehicle is at rest will be hereinafter referred to as "parking release load".

Incidentally, the torque T on the output shaft 16 can be calculated by the following expression.

$$T=[r(A+B)g \sin \theta]/i$$

In this expression, r is the dynamic load radius (m) of a wheel (the rear wheels 6 in FIG. 1); A is the dead weight (kg) of the vehicle 1; B is the weight (kg) of the load 9; g is the gravitational acceleration (9.8 m/s$^2$); i is the ratio of the differential 5; and θ is the inclination angle of the vehicle 1.

Figure 12:
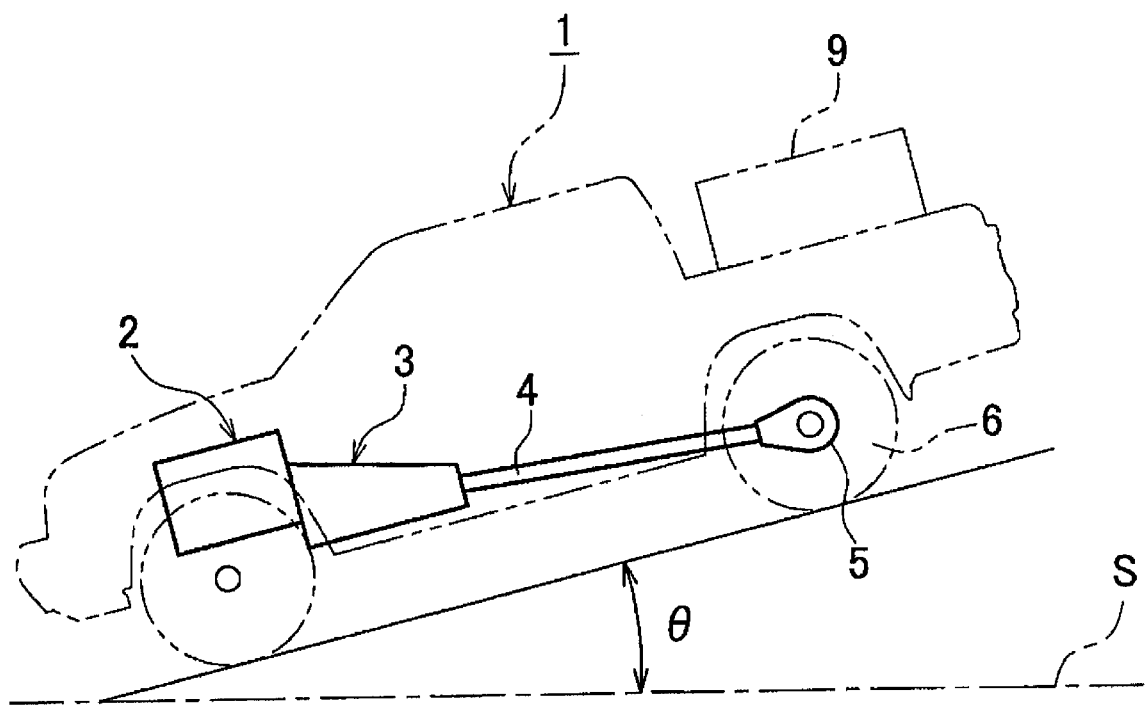
FIG. 12 is a diagram showing a state in which the posture of the vehicle shown in FIG. 1 is tilted forward.
Figure 13:
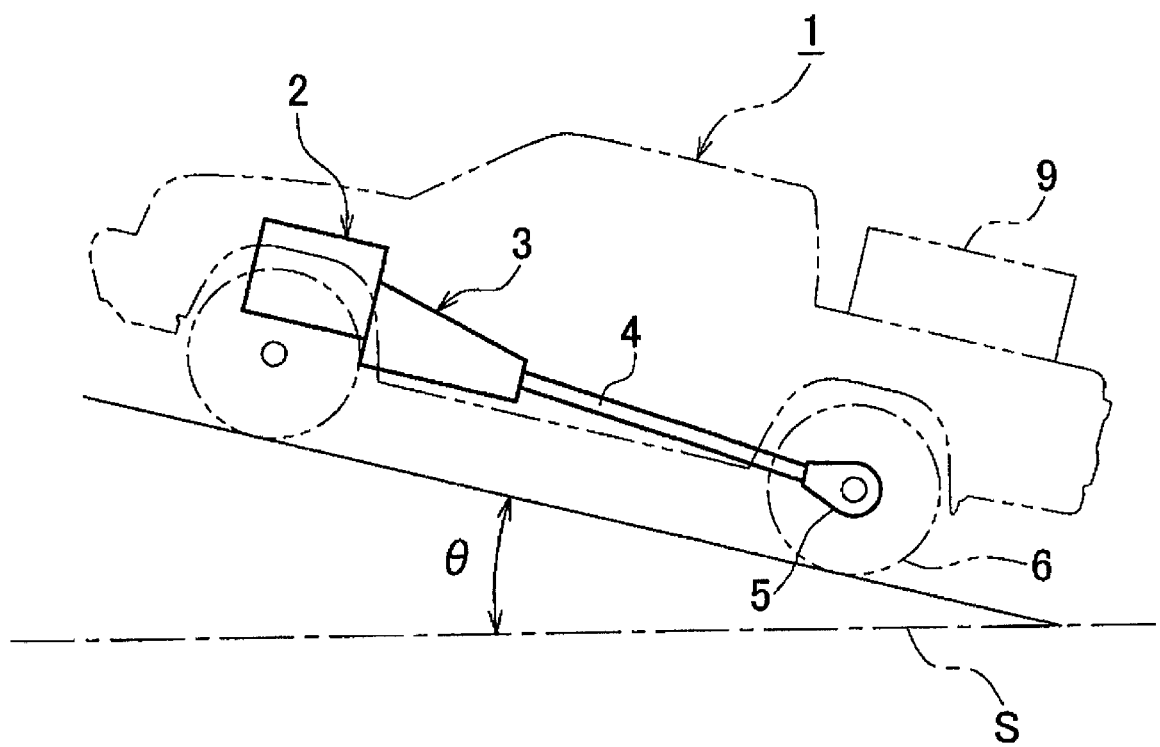
FIG. 13 is a diagram showing a state in which the posture of the vehicle is tilted rearward.

If the vehicle 1 is at rest on a flat road and is in a horizontal posture as shown in FIG. 1, the parking load is considered to be substantially zero, and therefore the parking release load becomes minimum. However, when the posture of the vehicle 1 is greatly inclined forward with respect to a horizontal line S as shown in FIG. 12 or inclined rearward as shown in FIG. 13 as in the case where the vehicle 1 is at rest on a slope road, such as an uphill road, a downhill road, etc., the parking load and the parking release load are both large. Naturally, during the inclined posture of the vehicle 1, the greater the weight on the rear wheels 6, which are drive wheels, the greater the parking load and the parking release load.

Thus, for example, if during a rest of the vehicle 1, the posture of the vehicle 1 is greatly inclined and therefore the parking load and the parking release load are both great, the changing to the parking range P is prohibited.

Specifically, with reference to the flowchart of FIG. 5, actions of the range-switching device 20 will be described in detail.

In the ordinary shift process, when a transmission range is selected with the shift lever 21, the selected range is detected by the range position sensor 95. On the basis of the detected range position, the transmission control device 8 appropriately rotationally drives the actuator 33 in a normal direction or the reverse direction to rotationally drive the range select control shaft 32 as shown by an arrow in FIG. 6, and, integrally with the range select control shaft 32, the detent lever 31 rotates in the same direction.

At this time, as the latch lever 34 moves over a ridge between adjacent groove recesses of the engagement groove of the fan-shape arm 31a of the detent lever 31, the latch lever 34 temporarily undergoes elastic deformation before the pin 34a engages with the next groove recess. Thus, the detent lever 31 is positioned and held by the latch lever 34.

Due to the tilting of the detent lever 31, the spool 17b of the manual valve 17 is slid, so that the manual valve 17 switches the range to the selected one of the ranges "P", "R", "N" and "D". This appropriately drives the hydraulic control device 15 so as to establish an appropriate power transmission path in the speed change mechanism portion 14.

Figure 5:
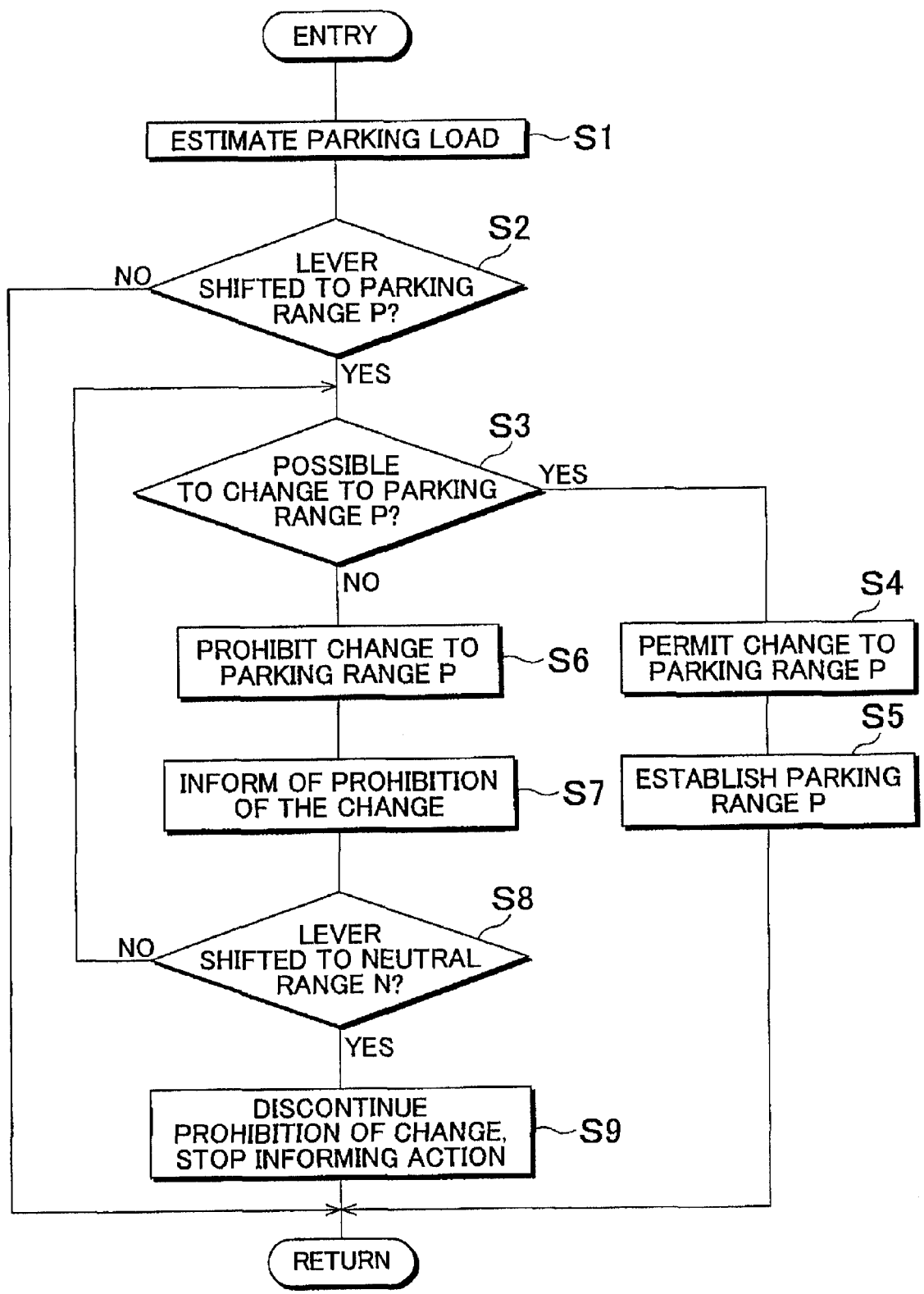
FIG. 5 is a flowchart for illustration of actions performed by the range-switching device shown in FIG. 3.

The flowchart shown in FIG. 5 is a portion of a main flowchart regarding the shift control of the automatic transmission 3, and is repeatedly executed in every constant cycle.

When the vehicle 1 rests, the flow shown in FIG. 5 is entered. Firstly in step S1, the transmission control device 8 takes in the detection outputs of the slope sensor 96, the G-sensor 97 and the load weight sensor 98 to estimate the parking load (torque T) on the basis of the aforementioned calculation expression.

Subsequently in step S2, the engine control device 7 checks whether or not the shift lever 21 has been moved to the parking range P. In this embodiment, the transmission control device 8 recognizes the selected range on the basis of the detection output of the range position sensor 95.

At this stage, for example, in the case where a range other than the parking range P has been selected, a negative determination is made in step S2, and the process goes to a program regarding the shift process (not shown). On the other hand, in the case where the parking range P has been selected, an affirmative determination is made in step S2, and the process proceeds to step S3.

In step S3, the transmission control device 8 checks whether or not the changing to the parking range P is possible. In this embodiment, it is checked whether or not the parking load (torque T) estimated in step S1 is greater than or equal to a predetermined threshold value X.

If T<X, that is, if the inclination angle θ of the vehicle 1 at rest is less than a predetermined value, a affirmative determination is made in step S3, and the process proceeds to step S4, in which the transmission control device 8 permits the changing to the parking range P. At this time, the lock mechanism 24 is put into the unlocked state as shown in FIG. 6. Incidentally, each arrowed line marked with (o) in FIG. 6 means a movable state.

After that, in step S5, the range is switched to the parking range P. At this time, the transmission control device 8 appropriately rotationally drives the actuator 33 in the normal or reverse direction to rotationally drive the range select control shaft 32 as shown by the arrow in FIG. 6, so that the detent lever 31 is tilted integrally with the range select control shaft 32. Therefore, the parking lock lever 43 is slid so that the taper cone 44 pushes the parking lock pawl 42 upward as shown in FIGS. 10 and 11 to engage the claw 42a of the parking lock pawl 42 into a space between teeth of the parking gear 41. Thus, the output shaft 16 is put into the locked state in which the output shaft 16 is physically unrotatable.

However, if T≧X, that is, if the inclination angle θ of the vehicle 1 at rest is greater than or equal to the predetermined value, an negative determination is made in step S3, and subsequently in step S6, the changing to the parking range P is prohibited. At this time, the lock mechanism 24 is put into the locked state as shown in FIG. 7. Incidentally, each arrowed line marked with (x) means an immovable state.

Subsequently in step S7, the transmission control device 8 drives the information device 25 so as to inform the driver of the vehicle that the changing to the parking range P is prohibited. Incidentally, the information device 25 is, for example, any of various buzzers that produce alarm sounds, or may also be a display by, for example, in characters, numerals, symbols, etc. or display an indication that corresponds to the alarm. Due to this information output, the driver is informed that the changing to the parking range P has been prohibited. Therefore, the driver can recognize that it is not an abnormality occurring in the vehicle. Due to this recognition, the driver can recognize that the present state of stop of the vehicle is a situation that is not suitable for parking. Thus, the foregoing information output can serve for the driver as advice that the vehicle should be moved to another place from the present place of stop.

Then, in step S8, the transmission control device 8 checks whether or not the shift lever 21 has been returned to the neutral range N. At this time, the transmission control device 8 recognizes the selected range on the basis of the detection output of the range position sensor 95.

If the shift lever 21 has not been returned to the neutral range N, a negative determination is made in step S8, and the process returns to step S3, in which the transmission control device 8 waits for the shift lever 21 to be returned to the neutral range N.

On the other hand, if the shift lever 21 is returned to the neutral range N, an affirmative determination is made in step S8, and subsequently in step S9, the present state in which the changing to the parking range P is prohibited is discontinued, and the informing action of the information device 25 is stopped. After that, the transmission control device 8 exits this flow of operation.

Incidentally, if the shift lever 21 is moved to the parking range P again, the transmission control device 8 enters the step S1. However, if the shift lever 21 is moved to a range (R, D) other than the parking range P, a shift process of switching the range to the selected range (R, D) is executed.

In the operation of the transmission control device 8 as described above, step S1 may be regarded as a load estimation portion in this embodiment, and step S3 may be regarded as a determination portion in this embodiment, and steps S4 to S9 may be regarded as a coping portion in this embodiment. Therefore, the transmission control device 8 is constructed to function as the load estimation portion, the determination portion, the coping portion, etc.

As described above, in this embodiment, when the range is changed to the parking range P at the time of rest of the vehicle 1, it is assumed that the range is switched to the parking range P, and on that assumption, it is estimated whether or not the present situation is a situation in which the changing from the parking range P to another range would be impossible. If the present situation is a situation in which the changing from the parking range P would be impossible, that is, if the present situation is a situation in which the vehicle 1 is rest in a greatly inclined posture, for example, on a slope road, then the changing to the parking range P is prohibited. If the present situation is a situation in which the changing from the parking range P would be possible, the changing to the parking range P is permitted.

Thus, in the case where the changing to the parking range P is prohibited, the driver can be informed that the present stop state of the vehicle is a situation that is not suitable for parking, and that it is advisable to move the vehicle from the present stop place to another place.

Therefore, unlike the aforementioned art related to the invention, the embodiment can avoid falling into a situation where the release from the parking range P becomes difficult after the range has been switched to the parking range P.

Therefore, it becomes possible to prevent excessively large parking load acting on the parking lock mechanism 23. Hence, it becomes possible to restrain deformation of the parking lock mechanism 23. Furthermore, since it is no longer necessary to forcibly change the range from the parking range P to another range by performing power assist through the use of a motor or the like as in the art related to the invention, the provision of extra equipment or the like will be avoided.

The invention is not limited only to the foregoing embodiments or constructions, but various other modifications and applications are conceivable.

The basic construction of automatic transmissions to which the invention is applicable is not limited to the type of automatic transmission used for the FR layout as described above, but is also applicable to other constructions, for example, a type of automatic transmission used for the FF layout.

Figure 14:
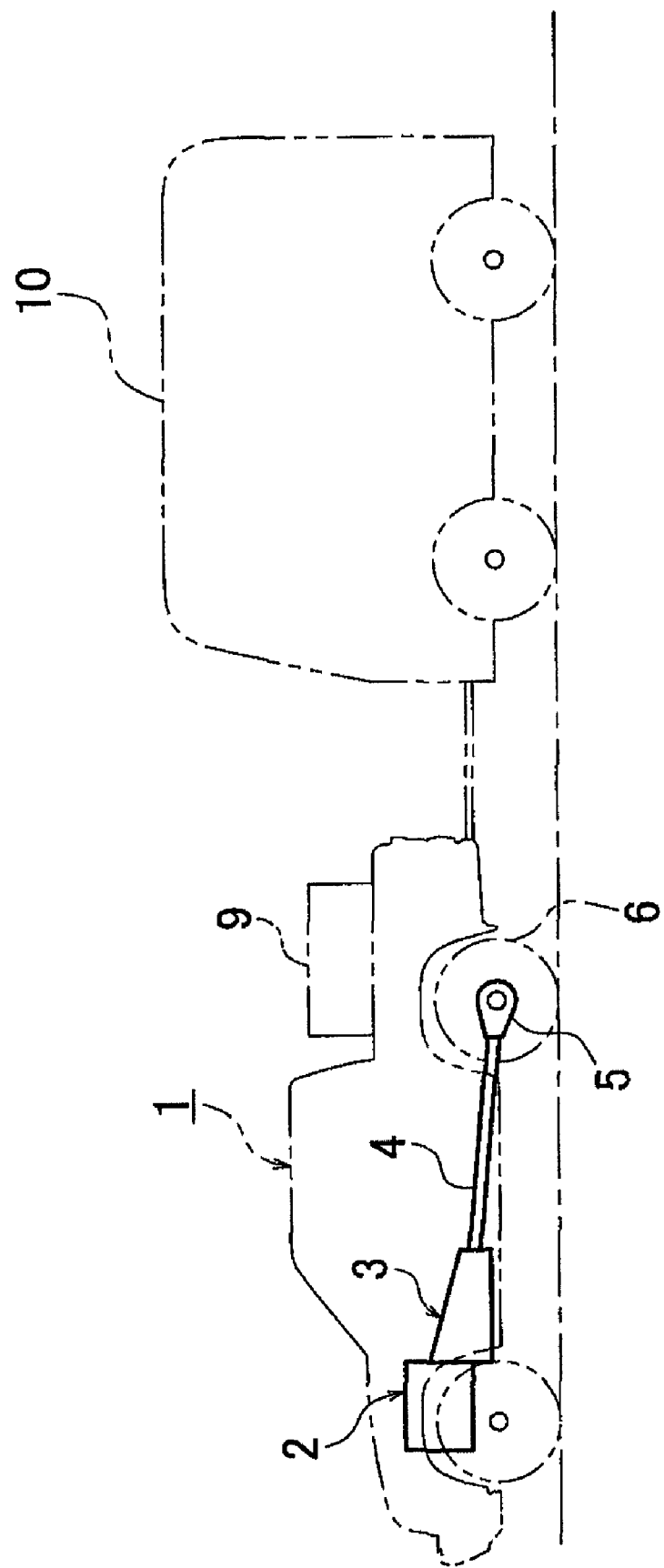
FIG. 14 is a schematic side view showing another example of the vehicle to which the invention is applicable.

Although the foregoing embodiment is described in conjunction with the case where the vehicle 1 is used alone, the invention can be further effective in the case where the vehicle 1 tows a trailer 10 as shown in FIG. 14, for example, a camping trailer or the like.

This will be explained as follows. In the case where the vehicle 1 tows a trailer 10, the parking load occurring in a situation where the vehicle 1 at rest is in an inclined posture is greater than in the case where the vehicle 1 is used alone. Therefore, in such a situation, it can comparatively often happen that once the range is switched to the parking range P, it is difficult to change the transmission range from the parking range P to another range.

However, as described in detail in conjunction with the foregoing embodiment, when the vehicle 1 at rest is in an inclined posture, the changing to the parking range P is prohibited by the fail-safe process, so that occurrence of the aforementioned inconvenience can be prevented. Therefore, in the case where the vehicle 1 tows a trailer 1 as shown in FIG. 14, that is, where the parking load is great, the invention is particularly effective.

In this embodiment, the parking load, that it, the torque T acting on the output shaft 16, can be calculated as in the following expression.

$$T=[r(A+B+C)g \sin \theta]$$

In this expression, r is the dynamic load radius (m) of a wheel (the rear wheels 6 in FIG. 1); A is the dead weight (kg) of the vehicle 1; B is the weight (kg) of the load 9; g is the gravitational acceleration (9.8 m/s$^2$); i is the ratio of the differential 5; and θ is the inclination angle of the vehicle 1.

The weight C of the trailer 10 can be detected by using a towing weight sensor or the like.

Although in the foregoing embodiments, the lock mechanism 24 is used to prohibit the changing to the parking range P at the time of the fail-safe process, it is also possible to adopt an formation in which the changing to the parking range P is prohibited not by using the lock mechanism 24, but merely by the transmission control device 8 prohibiting the driving of the actuator 33 when it is detected by the range position sensor 95 that the parking range P has been selected with the shift lever 21.

Since the actions by the fail-safe process are implemented through electronic control, the construction of this embodiment is advantageous in curbing the rise in the equipment cost; for example, the need for adding an extra piece of equipment is eliminated, or the like.

Although in the foregoing embodiments, the range-switching device 20 is of a type called shift-by-wire as an example, the range-switching device 20 may also be a type that uses a shift cable.

In the case where a shift cable is used, similarly to the foregoing embodiments, it suffices that the range-switching device 20 is caused to operate so as to prohibit the changing to the parking range P in the fail-safe process by using the lock mechanism 24. This will immobilize the shift lever 21 itself. Therefore, this allows the driver to be reliably informed that the changing to the parking range P is presently prohibited, and is thus preferable.

In the construction of this embodiment, the detent lever 31 is immovably constrained so as to prohibit the operation of shifting to the parking range P, as an action performed in the fail-safe process, and therefore, merely the lock mechanism 24 is employed. Therefore, the construction is advantageous in the simplification of equipment and the reduction of equipment cost, in comparison with the case where power assist means, such as a motor or the like, is employed as in an art related to the invention.

Although in the foregoing embodiment, the shift lever 21 mounted on the floor of the cabin of the vehicle is adopted as an example of range selection portion, the invention is also applicable if the range selection means is of a type that uses a shift button or a paddle shift lever provided on the steering wheel or handle although not shown.

In the foregoing embodiment, the lock mechanism 24 for mechanically immobilizing the detent lever 31 is used, and the shift lever 21 is allowed to be moved to the parking range P even when the lock mechanism 24 is engaged. Other constructions are also possible. For example, although not shown in the drawings, it is possible to adopt a construction in which the shift lever 21 is provided with a generally known shift lock mechanism so that the shift lever 21 is prevented from being moved to the parking range P as a fail-safe process when the parking load is greater than or equal to a predetermined value.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A range-switching device of an automatic transmission for a vehicle that selects a transmission range in the automatic transmission in accordance with need, comprising
    a control device that executes a fail-safe process of prohibiting changing of the transmission range to a parking range when there is a request for changing of the transmission range to the parking range if it is estimated that the changing from the parking range to another range would be impossible on an assumption that the transmission range is switched to the parking range.

2. The range-switching device of the automatic transmission, according to claim 1, wherein the changing from the parking range to another range is impossible as a result of a parking load that is greater than or equal to a predetermined value, wherein the parking load is a torque that acts on an output shaft of the automatic transmission.

3. The range-switching device of the automatic transmission, according to claim 2, wherein the torque that acts on the output shaft of the automatic transmission is found on the basis of an inclined posture of the vehicle or a dead weight of the vehicle when the vehicle is at rest.

4. The range-switching device of the automatic transmission, according to claim 1, further comprising:
- a range selection portion for selecting the transmission range;
- a driving device that switches the transmission range to a range selected by the range selection portion; and
- a parking lock device that causes an output shaft of the automatic transmission to be in an unrotatable state when the parking range is selected in the range selection portion,
- wherein the control device executes a shift process of controlling the driving device or controlling the parking lock device in order to switch the transmission range to a range selected by the range selection portion or switch the transmission range to an appropriate range in accordance with a state of run of the vehicle.

5. The range-switching device of the automatic transmission, according to claim 4, wherein in order to execute the fail-safe process, the control device has:
- a load estimation portion that estimates a parking load when the vehicle is at rest;
- a determination portion that determines whether or not the changing to the parking range is allowable by comparing a result of estimation by the load estimation portion with a predetermined threshold value; and
- a coping portion that prohibits the changing to the parking range if the determination portion determines that the changing to the parking range is not allowable.

6. The range-switching device of the automatic transmission, according to claim 4,
- wherein the driving device has:
- a detent lever that is pivotably supported and is rotationally driven in an appropriate direction in order to change a state of a manual valve that is a component element of a transmission range-switching hydraulic control device provided in the automatic transmission; and
- an actuator for rotationally driving the detent lever in the appropriate direction, and
- wherein the range-switching device further has:
- a detection portion that detects a position of the transmission range selected by the range selection portion; and
- a lock portion for physically immobilizing the detent lever in accordance with need, and
- wherein the control device executes:
- a shift process of switching the transmission range to the selected transmission range by electrically controlling the actuator based on a detection result provided by the detection portion; and
- the fail-safe process of prohibiting the changing to the parking range by immovably locking the detent lever via the lock portion if a parking load is greater than or equal to a predetermined value when the vehicle is at rest.

7. The range-switching device of the automatic transmission, according to claim 4,
- wherein the driving device has:
- a detent lever that is pivotably supported and is rotationally driven in an appropriate direction in order to change a state of a manual valve that is a component element of a transmission range-switching hydraulic control device provided in the automatic transmission; and
- an actuator for rotationally driving the detent lever in the appropriate direction, and
- wherein the range-switching device further has a detection portion that detects a position of the transmission range selected by the range selection portion, and wherein the control device executes:
- a shift process of switching the transmission range to the selected transmission range by electrically controlling the actuator based on a detection result provided by the detection portion; and
- the fail-safe process of prohibiting the changing to the parking range by prohibiting driving of the actuator even if the parking range has been selected by the range selection portion in a case where a parking load is greater than or equal to a predetermined value when the vehicle is at rest.

8. The range-switching device of the automatic transmission, according to claim 4,
- wherein the driving device has a detent lever that is pivotably supported and that is rotationally driven in an appropriate direction, in order to change a state of a manual valve that is a component element of a transmission range-switching hydraulic control device provided in the automatic transmission, and
- wherein the range-switching device further has:
- a shift cable that mechanically drivingly interconnects the detent lever and the range selection portion; and
- a lock portion for physically immobilizing the detent lever in accordance with need, and
- wherein the control device immovably locks the detent lever via the lock portion when the fail-safe process is executed.

9. The range-switching device of the automatic transmission, according to claim 1, further comprising an information device that informs a driver of the vehicle that the changing to the parking range is prohibited, when the fail-safe process has been executed.

10. The range-switching device of the automatic transmission, according to claim 9, wherein the information device includes at least one of a buzzer that produces an alarm sound and a display panel that displays an alarm.

11. A control method of a range-switching device of an automatic transmission for a vehicle that selects a transmission range in the automatic transmission in accordance with need, comprising:
- executing a fail-safe process of prohibiting changing of the transmission range to a parking range when there is a request for changing of the transmission range to the parking range if it is estimated that the changing from the parking range to another range would be impossible on an assumption that the transmission range is switched to the parking range.

12. A range-switching device of an automatic transmission for a vehicle that selects a transmission range in the automatic transmission in accordance with need, comprising:
- a control device that executes a fail-safe process of prohibiting changing of the transmission range to a parking range if there is a parking load greater than or equal to a predetermined value when the vehicle is at rest;
- a range selection portion for selecting a transmission range;
- a driving device that switches the transmission range to a range selected by the range selection portion;
- a parking lock device that causes an output shaft of the automatic transmission to be in an unrotatable state when the parking range is selected in the range selection portion,
- wherein the control device executes a shift process of controlling the driving device or controlling the parking lock device in order to switch the transmission range to a range selected by the range selection portion or switch the transmission range to an appropriate range in accordance with a state of run of the vehicle; and wherein in order to execute the fail-safe process, the control device has:

a load estimation portion that estimates the parking load when the vehicle is at rest;

a determination portion that determines whether or not the changing to the parking range is allowable by comparing a result of estimation by the load estimation portion with a predetermined threshold value; and a coping portion that prohibits the changing to the parking range if the determination portion determines that the changing to the parking range is not allowable.

13. The range-switching device of the automatic transmission, according to claim 12, wherein the driving device has:

a detent lever that is pivotably supported and is rotationally driven in an appropriate direction in order to change a state of a manual valve that is a component element of a transmission range-switching hydraulic control device provided in the automatic transmission; and an actuator for rotationally driving the detent lever in the appropriate direction, and wherein the range-switching device further has:

a detection portion that detects a position of the transmission range selected by the range selection portion; and a lock portion for physically immobilizing the detent lever in accordance with need, and wherein the control device executes:

a shift process of switching the transmission range to the selected transmission range by electrically controlling the actuator based on a detection result provided by the detection portion; and the fail-safe process of prohibiting the changing to the parking range by immovably locking the detent lever via the lock portion if the parking load is greater than or equal to the predetermined value when the vehicle is at rest.

14. The range-switching device of the automatic transmission, according to claim 12, wherein the driving device has:

a detent lever that is pivotably supported and is rotationally driven in an appropriate direction in order to change a state of a manual valve that is a component element of a transmission range-switching hydraulic control device provided in the automatic transmission; and an actuator for rotationally driving the detent lever in the appropriate direction, and wherein the range-switching device further has a detection portion that detects a position of the transmission range selected by the range selection portion, and wherein the control device executes:

a shift process of switching the transmission range to the selected transmission range by electrically controlling the actuator based on a detection result provided by the detection portion; and the fail-safe process of prohibiting the changing to the parking range by prohibiting driving of the actuator even if the parking range has been selected by the range selection portion in a case where the parking load is greater than or equal to the predetermined value when the vehicle is at rest.

15. The range-switching device of the automatic transmission, according to claim 12, wherein the driving device has a detent lever that is pivotably supported and that is rotationally driven in an appropriate direction, in order to change a state of a manual valve that is a component element of a transmission range-switching hydraulic control device provided in the automatic transmission, and wherein the range-switching device further has:

a shift cable that mechanically drivingly interconnects the detent lever and the range selection portion; and a lock portion for physically immobilizing the detent lever in accordance with need, and wherein the control device immovably locks the detent lever via the lock portion when the fail-safe process is executed.

* * * * *